(12) United States Patent
Hensel et al.

(10) Patent No.: US 11,909,294 B2
(45) Date of Patent: Feb. 20, 2024

(54) PRESSURE COMPENSATING ASSEMBLY

(71) Applicant: AUDI AG, Ingolstadt (DE)

(72) Inventors: Manfred Hensel, Wendelstein (DE); Daniel Wurm, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 781 days.

(21) Appl. No.: 16/944,712

(22) Filed: Jul. 31, 2020

(65) Prior Publication Data
US 2021/0095752 A1    Apr. 1, 2021

(30) Foreign Application Priority Data

Sep. 30, 2019  (DE) .......................... 102019126269.0

(51) Int. Cl.
| | |
|---|---|
| *H02K 5/20* | (2006.01) |
| *F16H 57/027* | (2012.01) |
| *B60K 1/00* | (2006.01) |
| *B60K 17/04* | (2006.01) |
| *B60K 17/22* | (2006.01) |

(52) U.S. Cl.
CPC .................. *H02K 5/20* (2013.01); *B60K 1/00* (2013.01); *B60K 17/04* (2013.01); *B60K 17/22* (2013.01); *F16H 57/027* (2013.01); *H02K 2205/09* (2013.01)

(58) Field of Classification Search
CPC .... F16H 57/027; H02K 2205/09; H02K 5/20; H02K 7/006; H02K 11/33; B60K 17/04; B60K 1/00; B60K 17/22; B60K 2001/003; B60K 2001/006
See application file for complete search history.

(56) References Cited

U.S. PATENT DOCUMENTS

2007/0074949 A1*  4/2007  Yoshioka ............. F16D 43/284
                                                       192/105 R
2008/0099258 A1   5/2008  Berhan
(Continued)

FOREIGN PATENT DOCUMENTS

CN        105829157 A    8/2016
DE          4240044 A1   6/1994
(Continued)

OTHER PUBLICATIONS

Kadomoto et al, Vehicle, Jun. 1, 2017, JP 2017094804 (English Machine Translation) (Year: 2017).*

(Continued)

*Primary Examiner* — Alexander A Singh
(74) *Attorney, Agent, or Firm* — Maier & Maier, PLLC

(57) ABSTRACT

A pressure compensating assembly for a drive mechanism of a vehicle, wherein the drive mechanism includes as drive components an electrical machine a power electronics unit, and a transmission, wherein each drive component is disposed in a respective housing which encloses an air space, wherein at least two air spaces of adjacent housings are interconnected in an air-permeable manner, wherein the pressure compensating assembly includes a pressure compensating member common to all drive components, which member connects the air spaces of all drive components of the drive mechanism to an environment and is disposed above a wading line of the vehicle when the pressure compensating assembly is installed in the vehicle.

20 Claims, 3 Drawing Sheets

(56) References Cited

U.S. PATENT DOCUMENTS

2016/0297385 A1* 10/2016 Hoshinoya ............ F04C 13/007
2018/0287467 A1* 10/2018 Ogino ................... B60L 3/0061

FOREIGN PATENT DOCUMENTS

| DE | 202006014877 U1 | 11/2006 |
| DE | 102008005395 A1 | 7/2009 |
| DE | 102008046446 A1 | 3/2010 |
| DE | 102010003256 A1 | 9/2011 |
| DE | 102011103998 A1 | 12/2012 |
| DE | 102011119875 A1 | 6/2013 |
| JP | 2017094804 A * | 6/2017 |

OTHER PUBLICATIONS

German Examination Report dated May 13, 2020 in corresponding German Application No. 102019126269.0; 12 pages; Machine translation attached.

Office Action dated Sep. 21, 2023, in corresponding Chinese Application No. 202010940371.3, 26 pages.

* cited by examiner

PRESSURE COMPENSATING ASSEMBLY

FIELD

The disclosure relates to a pressure compensating assembly for a drive mechanism of a vehicle, to a drive mechanism, and to a vehicle.

BACKGROUND

A component may have a housing which encloses an interior space. If a critical pressure for the interior space occurs that pressure can be balanced against the environment.

Patent document DE 10 2011 103 998 A1 describes an energy storage unit and/or energy conversion unit.

Patent document DE 10 2010 003 256 A1 describes a pressure equalizing member for a housing sealed off from an environment and a housing.

U.S. Pat. No. 2,008,099 258 A1 discloses a vented sealed housing assembly for a power train of a vehicle.

Against this background, the problem was to enable pressure compensation in an electrical drive mechanism.

SUMMARY

This problem is solved by a pressure compensating assembly, a drive mechanism, and a vehicle having the features of the disclosure. Embodiments of the pressure compensating assembly, the drive mechanism, and the vehicle can be derived from the description.

The pressure compensating assembly according to the invention is configured and intended for a drive mechanism. The drive mechanism has at least an electrical machine, a power electronics unit, and a transmission for driving the vehicle, wherein one respective drive component is disposed in a housing which encloses an air space for the respective drive component, wherein at least two air spaces of adjacent, particularly of directly adjacent, housings are interconnected in an air-permeable manner. The pressure compensating assembly comprises at least one pressure compensating member which is typically common to all drive components of the drive mechanism, e.g. centralized, which connects the air spaces enclosed by the housings of any and all drive components of the drive mechanism in an air-permeable manner to surroundings or to an environment, wherein the at least one pressure compensating member is disposed above or higher than the wading line of the vehicle when the pressure compensating assembly and the drive mechanism are installed in the vehicle.

For a potential implementation of the pressure compensating assembly, a housing is provided for all drive components, said housing comprising an air-permeable housing opening, i.e. just one common housing opening for all air spaces of all drive components, towards the environment which is connected to the centralized common pressure compensating assembly.

The one housing opening, i.e. the just one housing opening for all air spaces of all drive components, is disposed at a highest point of the drive mechanism and/or above or higher than the wading line of the vehicle when the pressure compensating assembly and/or the drive mechanism is/are installed in the vehicle. The wading line provided for the vehicle describes a wading depth of a body of water through which the vehicle can pass. Since the at least one pressure compensating member is disposed above the wading line and thus above the wading depth, ingress of water from the body of water into the pressure compensating member and thus into the drive mechanism is prevented.

In one embodiment, the one or the just one housing opening is directly connected to the common centralized pressure compensating member. The pressure compensating member can be disposed in the housing opening.

In an alternative embodiment, the pressure compensating assembly comprises a vent line, wherein the typically just one housing opening is connected to the pressure compensating member via the vent line. In this embodiment, a first end of the vent line is connected to the housing opening and a second end of the vent line is connected to the common pressure compensating member, which is disposed above or higher than the wading line of the vehicle when the pressure compensating assembly is installed therein. Optionally, an additional pressure compensating member can be used in this case, which is disposed between the housing opening and the first end of the vent line. Such a vent line is provided if the one housing opening for the air spaces of all drive components should be disposed below the wading line.

The at least two air spaces and/or two air spaces, respectively, which are interconnected in an air-permeable manner, are for example connected via an air-permeable interface of the pressure compensating assembly, which interface connects the two air spaces in an air-permeable manner. Such an interface, e.g. an electrical interface, can be disposed between the electrical machine and the power electronics unit or between their respective housings and for example comprise electric lines which connect the electrical machine and the power electronics unit in an electrically conductive manner, wherein such electrical interface is configured and/or can be designated as an alternating current or AC interface. Alternatively or in addition, the pressure compensating assembly can comprise a mechanical interface via which the transmission and the electrical machine are mechanically connected, wherein a shaft for connecting the transmission and the electrical machine is conducted through such a mechanical interface.

Alternatively or in addition, the at least two air spaces are interconnected via a transition module of the pressure compensating assembly, which module is at least air-permeable. This transition module can also be configured to be fluid-permeable, particularly liquid-permeable, for example for a coolant such as water or oil. Such a transition module can be configured as a membrane and/or a maze or include a membrane and/or a maze. It is an option that the transition module is disposed in a housing wall between the two adjacent drive components or in an interface described above. Furthermore, such a transition module can also mechanically connect the electrical machine and the transmission.

The pressure compensating assembly is provided for a drive mechanism for driving at least one drive axle of the vehicle, wherein the drive mechanism is connected to the drive axle via the transmission, and the drive axle itself is connected to at least one wheel for driving the vehicle.

The drive mechanism according to the invention for a vehicle comprises an electrical machine, a power electronics unit, a transmission, and an embodiment of the pressure compensating assembly presented above.

The vehicle according to the invention comprises a drive mechanism, for example an embodiment of the drive mechanism according to the invention, and an embodiment of the pressure compensating assembly presented above.

Furthermore, at least one drive component of the drive system, typically at least the electrical machine, has a cooling system for the coolant. Such a cooling system can either be configured as a closed system in the air space of the respective drive component, with which a wet machine concept can be implemented. It is also an option that such a cooling system is configured as a closed cooling system with which a dry machine concept can be implemented, wherein the closed cooling system has cooling ducts for the coolant which are disposed in the respective air space. In an embodiment, the transition module described above is not only air-permeable but also fluid-permeable for the respective coolant, particularly liquid-permeable. In a dry machine concept, the transmission and the electrical machine are connected via an air and fluid permeable transition module. In this case, the electrical machine and the power electronics unit are only connected in an air-permeable and electrically conductive manner, e.g. via an interface.

In a wet machine concept, the electrical machine and the power electronics are connected in an air-permeable and electrically conductive manner, whereas the electrical machine and the transmission are only connected in an air-permeable manner, but in a liquid-impermeable manner. If a transition of the coolant from the wet electrical machine to the power electronics unit is permissible or allowed based on the coolant type, an air and liquid-permeable transition module is disposed between the power electronics unit and the electrical machine, e.g. within an interface. If a transition of the coolant from the wet electrical machine to the power electronics unit should be or is avoided based on the coolant type, the just air-permeable and electrically conductive interface or a just air-permeable and fluid-impermeable, particularly liquid-impermeable or liquid-proof transition module, which may also be disposed in the interface, is disposed between the power electronics unit and the electrical machine.

The pressure compensating assembly can be used, inter alia, to centralize the pressure compensating function for an electrical axle drive mechanism.

This allows a considerable reduction of what is needed to ensure pressure compensation, since just one central and/or common pressure compensating member can be introduced for all drive components of the drive mechanism instead of multiple individual pressure compensating members for each drive component of the drive mechanism, i.e. the transmission, the electrical machine, and the power electronics unit. This central pressure compensating member can be dimensioned accordingly with respect to volumes, e.g. air volumes, of the air spaces of all drive components or components involved in the drive mechanism.

Centralization of the pressure compensating member can massively reduce the effort otherwise caused by having to make adjustments of housings for multiple drive components and to provide respective seals and membranes, since only a single housing adjustment and one-time provision of a membrane and a seal is required.

Furthermore, new positioning options are created for the central and/or common pressure compensating member, for which pressure compensating member an ideal position can be selected in the entire drive mechanism or in an entire drive. Suitable positioning or placement can eliminate the need for an additional vent hose or snorkel and other components, since at least one drive component of the electrical drive mechanism is above or higher than the wading line in almost every vehicle and thus meets a respective wading line requirement. This creates considerable additional potential savings, both in development and with respect to direct material costs.

The pressure compensating assembly can be implemented in different ways based on the drive mechanism, for example based on the type of electrical machine. Types of electrical machines, namely, dry electrical machines and wet electrical machines and the respective drive types, can be distinguished with respect to pressure compensation and air exchange.

A single pressure compensating member catering to multiple drive components or components can be placed at various useful and/or intelligent positions in the vehicle.

In addition, a combination and/or bundling of drive components in an electric drive train for shared use of the just one pressure compensating member is possible, wherein the optionally provided snorkel can be eliminated as well.

It will be appreciated that the features mentioned above and the features to be explained below cannot just be used in the combination described but in any other combination or by themselves, without deviating from the scope of the present invention.

BRIEF DESCRIPTION OF THE DRAWINGS

The disclosure is schematically represented in the drawings based on embodiments thereof and will be described schematically and in detail with reference to the drawings.

The figures are described coherently and as a whole, wherein like reference numerals are assigned to like components.

DETAILED DESCRIPTION

Figure 1:
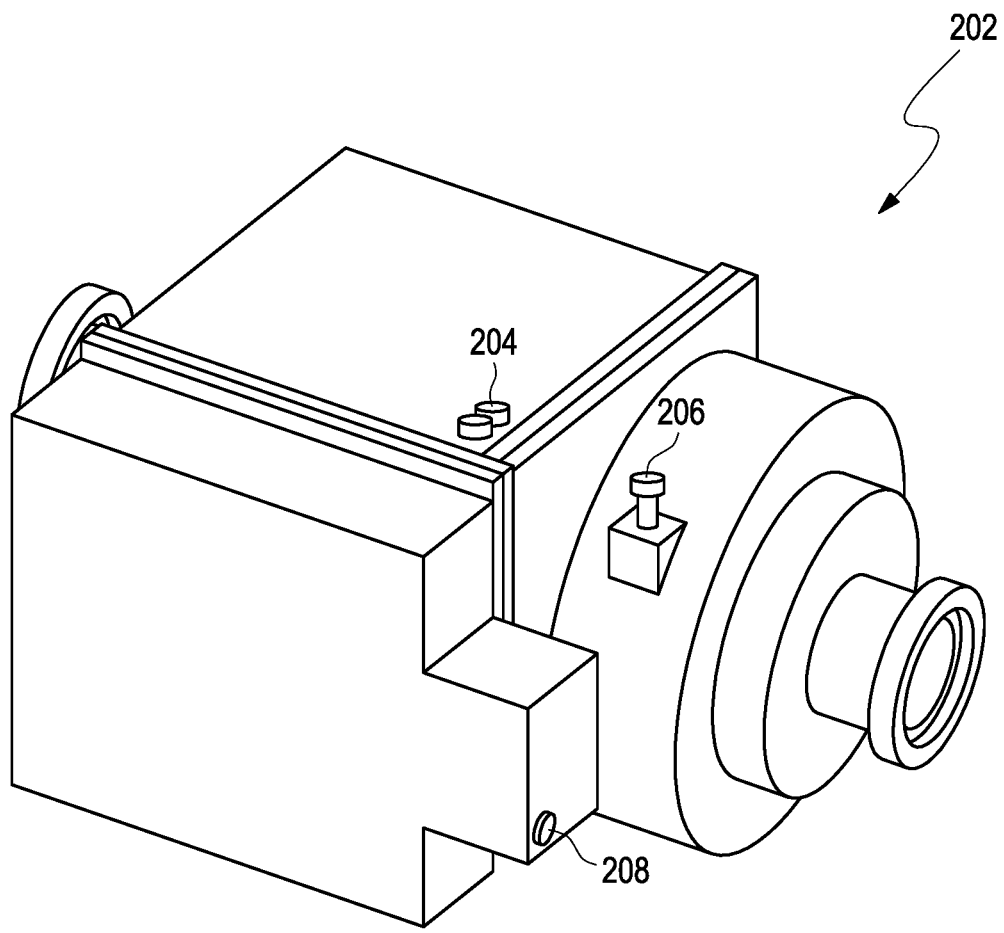
FIG. 1 is a schematic view of an assembly known from prior art.

The assembly 202 shown schematically in FIG. 1 is provided as an axle drive for a vehicle. This device includes as drive components an electrical machine, a transmission, and a power electronics unit, wherein one pressure compensating member 204, 206, 208 is provided for each respective drive component, that is, a pressure compensating member 204 for the electrical machine, a pressure compensating member 206 for the transmission, and a pressure compensating member 208 for the power electronics unit.

Accordingly, multiple pressure compensating members 204, 206, 208 were installed in multiple drive components which can exceed a specific air volume in prior art devices to be able to balance any positive or negative pressure in the interior of the respective drive component or respective component as fast as possible with an environmental pressure.

This is necessary, on the one hand, to avoid damage to interface seals and, on the other hand, to prevent moisture from entering a respective interior via the sealing elements or interfaces, since pressure differences may occur due to thermal differences between a temperature of the drive components and a temperature of an environment of the device. This can occur abruptly when the vehicle is traveling through water, as soon as a drive component at operating temperature having a temperature of 95° C. immerses into water at a temperature near the freezing point.

Figure 2:
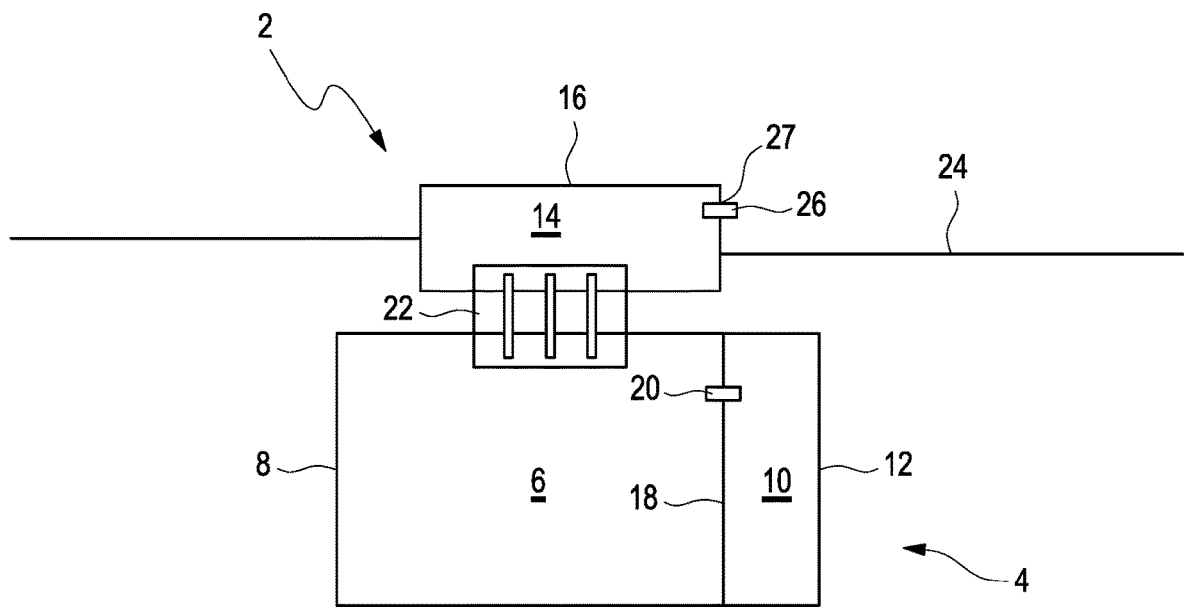
FIG. 2 is a schematic view of a first embodiment of the pressure compensating assembly according to the invention.

The first embodiment of the pressure compensating assembly 2 schematically shown in FIG. 2 is intended for an electrical drive mechanism 4 of a vehicle which comprises, as drive components, an electrical machine 6, which is disposed in a first housing 8, a transmission 10, which is disposed in a second housing 12, and a power electronics unit 14, which is disposed in a third housing 16 and in this case includes a pulse-controlled inverter. The electrical drive mechanism 4 is in this case associated with an axle, particularly a drive axle, of the vehicle, on which axle further wheels of the vehicle are disposed, and is configured to drive said wheels and thus the vehicle.

The two housings 8, 12 for the electrical machine 6 and the transmission 10 are positioned directly next to each other and share a housing wall 18 which separates the electrical machine 6 and the transmission 10. A transition module 20 connecting the electrical machine 6 and the transmission 10 is disposed in the housing wall 18, which module is configured to allow an exchange of air between the electrical machine 6, in this case an air space for the electrical machine 8 enclosed by the first housing 8, and the transmission 10, in this case an air space for the transmission 10 enclosed by the second housing 12. Furthermore, the electrical machine 6 and the power electronics unit 14, and thus the first and third housings 8, 16, are interconnected via an air-permeable interface 22, in this case an alternating current interface or AC interface, which interface is further configured to allow an exchange of air between the electrical machine 6, in this case the air space for the electrical machine 6 enclosed by the first housing 8, and the power electronics unit 14, in this case an air space for the power electronics unit 14 enclosed by the third housing 16.

In addition, FIG. 2 shows a wading line 24 of the vehicle. It is envisaged that the power electronics unit 14 is disposed vertically above or higher than the electrical machine 6 and the transmission 10 when the drive mechanism 4 is installed in the vehicle. The embodiment of the pressure compensating assembly 2 includes a pressure compensating member 26 which is disposed in a housing opening 27 of the third housing 16. The housing opening 27 and the pressure compensating member 26 are disposed vertically above or higher than the wading line 24 of the vehicle. It is possible that the housing opening 27 and the pressure compensating member 26 are disposed at a highest point of the drive mechanism 4.

Furthermore, a dry machine concept is implemented here for the electrical machine 6 and/or the drive mechanism 4. The electrical machine 6 includes a cooling system with cooling ducts for a coolant, wherein the coolant includes as a cooling substance water, glycol, or oil, or a mixture of at least two of these cooling substances. In the dry machine concept, the air space to be ventilated of the electrical machine 6 and the coolant are separated from each other spatially and in a media-tight manner, for example in the closed cooling system of the electrical machine 6. The oil-lubricated and oil-cooled transmission 10 and the electrical machine 6 are mechanically connected just by a shaft having a shaft sealing ring, wherein such a shaft is disposed in the transition module 20 or in another mechanical interface between the electrical machine 6 and the transmission 10. The power electronics unit 14 is connected to the electrical machine 6 via the interface 22, which is configured as an AC interface. The electrical machine 6 is only sealed off from the environment or surroundings in the dry machine concept. However, at least one air-permeable opening is disposed and/or provided between the power electronics unit 14 and the electrical machine 6, for example within the interface 22, which is why the power electronics unit 14 and the electrical machine 6 can exchange air at almost any volumetric flow without an additional element. In the embodiment of the pressure compensating assembly 2 presented here, the transition module 20 also provides an option of exchanging air and thus compensating pressure between the transmission 10 and the electrical machine 6.

The pressure compensating member 26 for the entire drive mechanism 4 with the surroundings or the environment is in this case disposed and/or installed at the highest possible point within the vehicle, here in the power electronics unit 14. The exchange of air and thus compensation of pressure between the air space of the transmission 10 and the air space of the electrical machine 6 can be implemented in this case in a cost-effective manner by the transition module 20, which comprises a hole with a membrane or a type of maze in an end plate and is disposed in the common housing wall 18 between the electrical machine 6 and the transmission 10 or between their air spaces, respectively.

Figure 3:
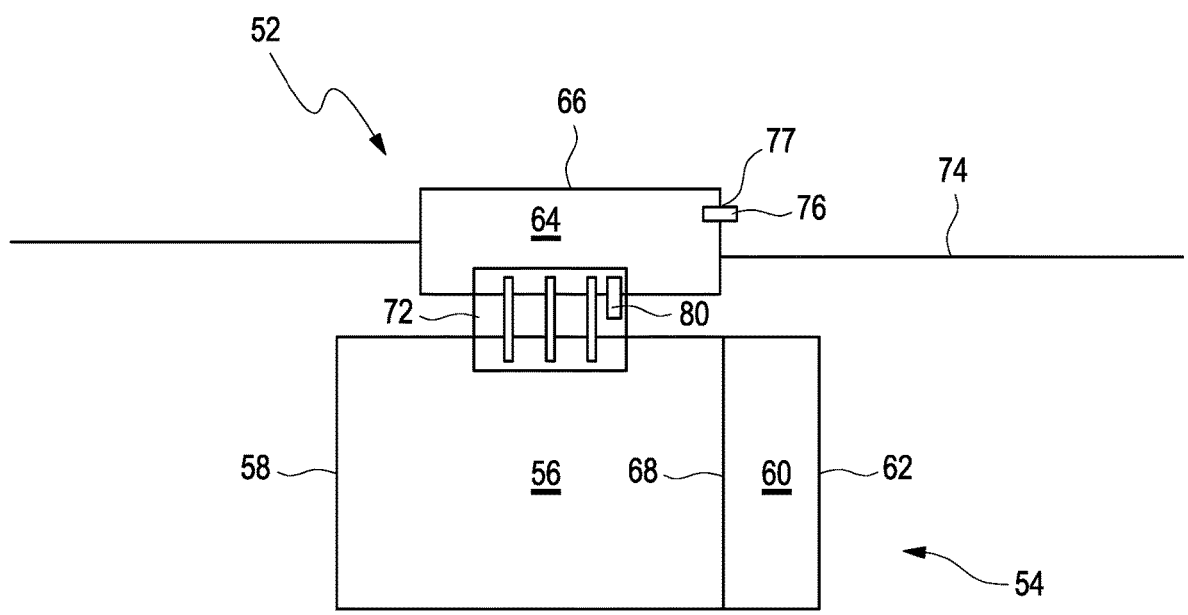
FIG. 3 is a schematic view of a second embodiment of the pressure compensating assembly according to the invention.

The second embodiment of the pressure compensating assembly 52 schematically shown in FIG. 3 is intended for an electrical drive mechanism 54 of a vehicle which comprises, as drive components, an electrical machine 56, which is disposed in a first housing 58, a transmission 60, which is disposed in a second housing 62, and power electronics unit 64, which is disposed in a third housing 66 and in this case includes a pulse-controlled inverter. The electrical drive mechanism 54 is in this case associated with a drive axle of the vehicle, on which axle further wheels of the vehicle are disposed, and is configured to drive said wheels and thus the vehicle.

The two housings 58, 62 for the electrical machine 56 and the transmission 60 are positioned directly next to each other and share a housing wall 68 which separates the electrical machine 56 and the transmission 60. Furthermore, the electrical machine 56 and the power electronics unit 64, and thus the first and third housings 58, 66, are interconnected via an interface 72, in this case an alternating current interface or AC interface, which interface is further configured to allow an exchange of air between the electrical machine 56, in this case the air space for the electrical machine 58 enclosed by the first housing 58, and the power electronics unit 64, in this case an air space for the power electronics unit 64 enclosed by the third housing 66. Also disposed in the interface 72 is a transition module 80 which interconnects the electrical machine 56 and the power electronics unit 64 and is configured to allow an exchange of air between the electrical machine 56 and the power electronics 64.

In addition, FIG. 3 shows a wading line 74 of the vehicle. It is envisaged that the power electronics unit 64 is disposed vertically above or higher than the electrical machine 56 and the transmission 60 when the drive mechanism 54 is installed in the vehicle. The embodiment of the pressure compensating assembly 52 includes a pressure compensating member 76 which is disposed in a housing opening 77 of the third housing 66. The housing opening 77 and the pressure compensating member 76 are disposed vertically above or higher than the wading line 74 of the vehicle. It is possible that the housing opening 77 and the pressure compensating member 76 are disposed at a highest point of the drive mechanism 54. In addition, a wet machine concept is implemented for the electrical machine 56.

The wet machine concept for the electrical machine 56 differs from the dry machine concept or machine type by eliminating a separation of the cooling system of the electrical machine 56 from the air space of the electrical machine 56. A continuous air space, partially filled with oil, from the electrical machine 56 to the transmission 60 and/or between the electrical machine 56 and the transmission 60 is provided. No additional measures for exchanging air or for compensating pressure between the electrical machine 56 and the transmission 60 are necessary.

Two variants are possible as regards a connection from the electrical machine 56 to the power electronics unit 64 or between the electrical machine 56 and the power electronics unit 64, respectively. If the power electronics 64 is to be protected from oil droplets and/or oil mist from the electrical machine 56, a membrane or a maze or a maze-like structure is introduced as transition module 80 between the power electronics unit 64 and the electrical machine 56 in the air space of the interface 72 or in the AC interface space, respectively, via which module an exchange of air between the electrical machine 56 to the power electronics unit 64 can be ensured without transmitting fluids, particularly liquid media, in a fluid-tight manner, particularly a liquid-tight manner. If an entry of oil mist, depending on the type of oil used, is no problem for the power electronics unit 64, a membrane or additional measure at this point can be completely eliminated. In this case, only a single pressure compensating member 76 is provided at the highest point of the drive mechanism 54 within the vehicle for a complete drive mechanism 54.

Figure 4:
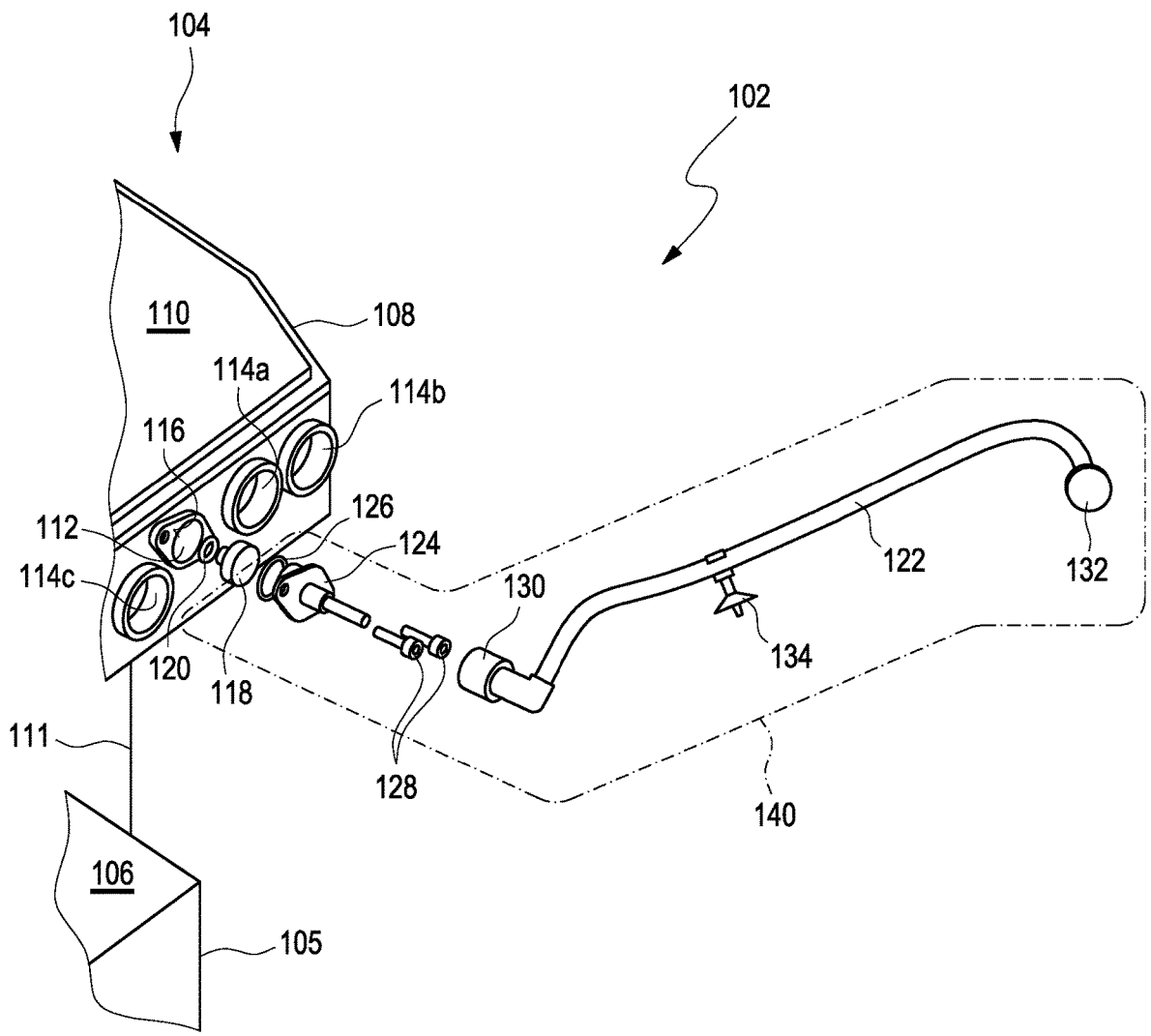
FIG. 4 is a schematic view of a third embodiment of the pressure compensating assembly according to the invention.

The third embodiment of the pressure compensating assembly 102 according to the invention schematically shown in FIG. 4 is intended for an electrical drive mechanism 104 of a vehicle, which comprises multiple drive components of which FIG. 4 shows an electrical machine 106 disposed in a first housing 105 and power electronics unit 110 disposed in a second housing 108, wherein the housings 105, 108 of the power electronics unit 110 and the electrical machine 106 are connected via an interface 111, wherein an exchange of air between the housings 105, 108 is also possible said interface 111. The power electronics unit 110 is disposed vertically above or higher than the electrical machine 106 when the drive mechanism 104 is installed in the vehicle.

The second housing 108 for the power electronics unit 110 comprises multiple housing openings 112, 114a, 114b, 114c, wherein a first housing opening 112, which may be disposed in the housing 108 anyway or is introduced for implementing the embodiment of the pressure compensating assembly 102, interacts with the embodiment of the pressure compensating assembly 102.

The first housing opening 112 has on its edge a processed sealing surface 116 for the second housing 108. The pressure compensating assembly 102 includes a first pressure compensating member 118 and a first sealing ring 120, wherein the first sealing ring 120 is disposed between the sealing surface 116 and the first pressure compensating member 118.

In addition, the third embodiment of the pressure compensating assembly 102 includes as additional system components a vent line 122, a receiving element 124 for the vent line 122, a second sealing ring 126, which is disposed between the first pressure compensating member 118 and the receiving element 124 for the vent line 122, two screws 128 for fastening the receiving element 124 to the first housing 108, and a clutch 130, which is disposed on a first end of the vent line 122 and includes a third sealing ring not shown in the figure, wherein the first end in this case faces the second housing 108 and thus the drive mechanism 104. An additional second pressure compensating member 132 is disposed on a second end of the vent line 122, which is facing away from the second housing 108. Furthermore, the vent line 122 can be fastened to the vehicle by means of at least one fastening element 134. These additional system components are enclosed by a dotted and dashed line 140 in FIG. 4.

If the first pressure compensating member 118 and the first housing opening 112 are disposed vertically above and/or higher than a wading line of the vehicle, the additional system components described above can be eliminated. If the first pressure compensating member 118 and/or the first housing opening 112 are disposed vertically below and/or lower than the wading line of the vehicle, the additional system components are required, wherein the second end of the vent line 122 and the pressure compensating member 132 positioned thereon are disposed above and/or higher than a wading line of the vehicle.

In the assembly 202 known from prior art, other than in each embodiment of the pressure compensating assembly 2, 52, 102 presented above, each component of the electrical drive train, i.e. the transmission, the electrical machine, and the power electronics unit must itself ensure sufficient pressure compensation for the air volume This means that pressure compensating members 204, 206, 208 are installed at various places of the drive. Depending on the design of the respective pressure compensating member 204, 206, 208, this means additional costs for machining the housing, for seals and membrane elements for each component. If a position of at least one pressure compensating member 204, 206, 208 is below a wading line requirement, which can vary depending on the vehicle type, a hose or snorkel is needed in addition to the at least one pressure compensating member 204, 206, 208. It must be conducted and fastened within the vehicle in a manner that the drive component of the assembly 202 can breathe even when passing through the threshold wading depth, including provisions for any misuse requirement. Furthermore, connecting interfaces and fastening means must be added to the affected components in the vehicle, which can cause high costs per vehicle.

The invention claimed is:

1. A pressure compensating assembly comprising:
a drive mechanism of a vehicle, wherein the drive mechanism includes as drive components an electrical machine, a power electronics unit, and a transmission, wherein the electrical machine is disposed in a first housing, the power electronics unit is disposed in a second housing different from the first housing, and the transmission is disposed in a third housing different from the first housing and the second housing, each of the first housing, the second housing, and the third housing enclosing a respective air space, wherein at least two air spaces of adjacent housings are interconnected in an air-permeable manner, wherein the pressure compensating assembly further comprises a common pressure compensating member to all drive components, wherein the common pressure compensating member connects the air spaces of all drive components of the drive mechanism to an environment and is disposed above a wading line of the vehicle when the pressure compensating assembly is installed in the vehicle.

2. The pressure compensating assembly according to claim 1, having a housing for all drive components, which housing comprises a housing opening which is connected to the common pressure compensating member.

3. The pressure compensating assembly according to claim 2, wherein the housing opening is disposed at a highest point of the drive mechanism and/or above the wading line of the vehicle when the pressure compensating assembly is installed in the vehicle.

4. The pressure compensating assembly according to claim 3, wherein the one housing opening is directly connected to the common pressure compensating member.

5. The pressure compensating assembly according to claim 3, wherein the at least two air spaces are interconnected via an interface.

6. The pressure compensating assembly according to claim 3, wherein the at least two air spaces are interconnected via an air-permeable transition module.

7. The pressure compensating assembly according to claim 2, wherein the housing opening is directly connected to the common pressure compensating member.

8. The pressure compensating assembly according to claim 7, wherein the at least two air spaces are interconnected via an interface.

9. The pressure compensating assembly according to claim 7, wherein the at least two air spaces are interconnected via an air-permeable transition module.

10. The pressure compensating assembly according to claim 2, wherein the housing opening is connected to the common pressure compensating member via a vent line.

11. The pressure compensating assembly according to claim 10, wherein the at least two air spaces are interconnected via an interface.

12. The pressure compensating assembly according to claim 10, wherein the at least two air spaces are interconnected via an air-permeable transition module.

13. The pressure compensating assembly according to claim 2, wherein the at least two air spaces are interconnected via an interface.

14. The pressure compensating assembly according to claim 2, wherein the at least two air spaces are interconnected via an air-permeable transition module.

15. The pressure compensating assembly according to claim 2, for a drive mechanism for driving at least one drive axle of the vehicle, wherein the drive mechanism is connected to the at least one drive axle via the transmission.

16. The pressure compensating assembly according to claim 1, wherein the at least two air spaces are interconnected via an interface.

17. The pressure compensating assembly according to claim 16, wherein the at least two air spaces are interconnected via an air-permeable transition module.

18. The pressure compensating assembly according to claim 1, wherein the at least two air spaces are interconnected via an air-permeable transition module.

19. The pressure compensating assembly according to claim 1, for a drive mechanism for driving at least one drive axle of the vehicle, wherein the drive mechanism is connected to the at least one drive axle via the transmission.

20. A drive mechanism for a vehicle,
wherein the drive mechanism includes as drive components an electrical machine a power electronics unit, and a transmission, wherein the electrical machine is disposed in a first housing, the power electronics unit is disposed in a second housing different from the first housing, and the transmission is disposed in a third housing different from the first housing and the second housing, each of the first housing, the second housing, and the third housing enclosing a respective air space, wherein at least two air spaces of adjacent housings are interconnected in an air-permeable manner, the drive mechanism further comprising a common pressure compensating member to all drive components, wherein the common pressure compensating member connects the air spaces of all drive components of the drive mechanism to an environment and is disposed above a wading line of the vehicle when the drive mechanism is installed in the vehicle.

* * * * *